Jan. 21, 1936.　　　　L. F. C. HART　　　　2,028,209
REMOVABLE HOOD FOR THE RUMBLE SEAT OF AUTOMOBILES
Filed July 27, 1934　　　2 Sheets-Sheet 1

INVENTOR-
L. F. C. HART
BY Louis W. Careau
ATTORNEY.

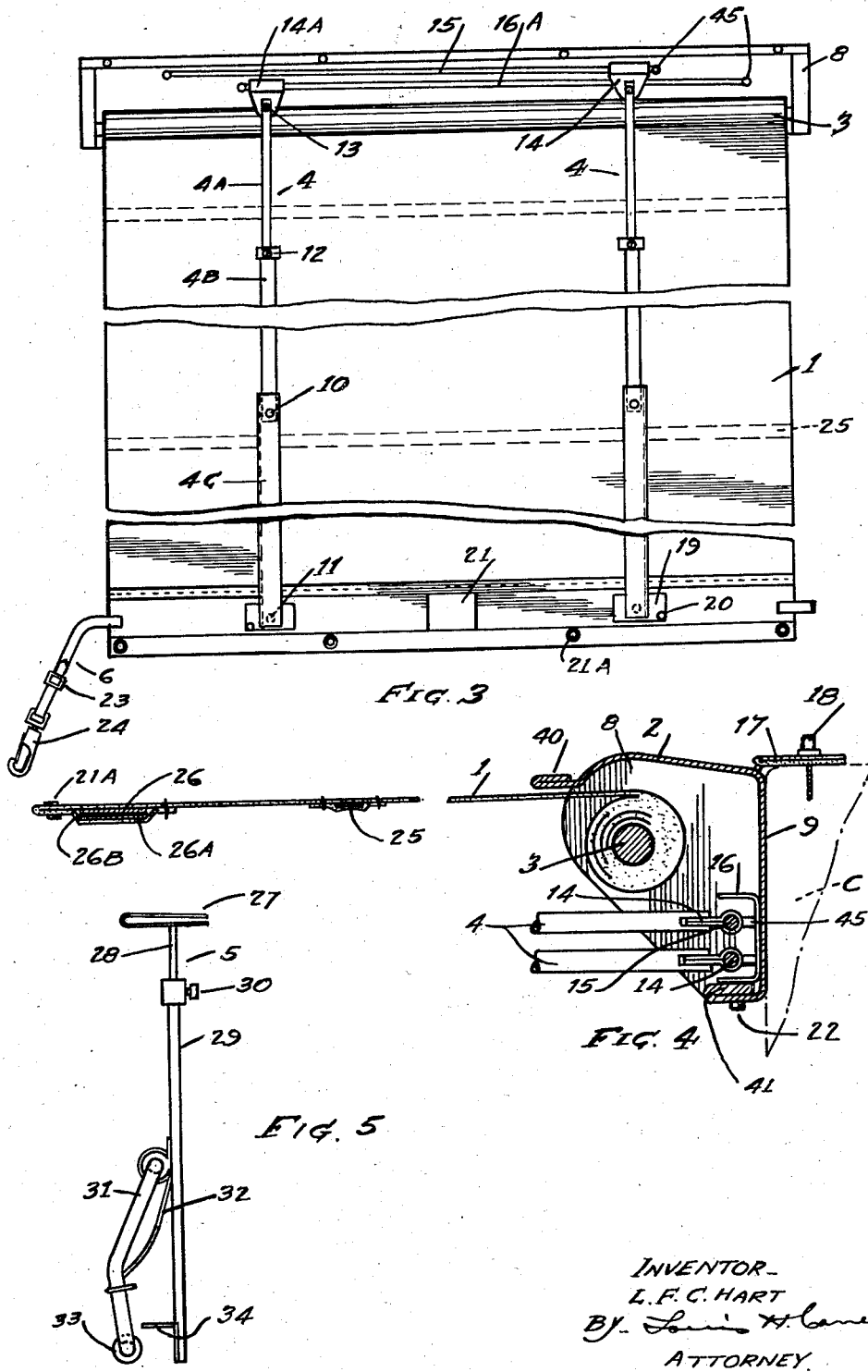

Patented Jan. 21, 1936

2,028,209

UNITED STATES PATENT OFFICE 2,028,209

REMOVABLE HOOD FOR THE RUMBLE SEAT OF AUTOMOBILES

Lawrence F. C. Hart, Ottawa, Ontario, Canada

Application July 27, 1934, Serial No. 737,269
In Canada July 29, 1933

7 Claims. (Cl. 296—98)

This invention relates to removable hoods for the rumble seat of automobiles.

The objects of the invention, generally, are to improve on known rumble seat hoods.

A specific object is to so design a hood that it can be easily applied and removed while the automobile is in motion.

Another object is to so design the hood that the appearance of the automobile is not changed when the curtain is drawn home or the hood removed.

Another object is to so design the hood that it can be readily applied to any make of automobile.

Still another specific object is to design a rigid and effective hood, one requiring relatively few parts most of which are comprised in a relatively small removable unit.

Other objects will appear as the specification is read in the light of the drawings.

As already stated, the device is designed to adapt itself to any make of automobile and it may conveniently take the form of an accessory, that is, a separate unit purchased as such and applied permanently or not, to an already built automobile, or built into the top at the factory. When taking the form of an accessory, it may be installed upon a fixed top or a collapsible top.

In the drawings, wherein like numerals of reference indicate corresponding parts in the various figures, the preferred form only of the device has been shown and as such, it may be applied to the automobile top thus, that is, (1) removably fastened to a fixed top; (2) removably fastened to a collapsible top, or (3) permanently applied or built into a fixed top.

Figure 3 is a fragmentary bottom plan view of the unit showing the curtain in extended position.

Figure 4 is a fragmentary enlarged cross section of the unit.

Figure 5 is a side elevation of the rear strut or support for the curtain.

Figure 1:
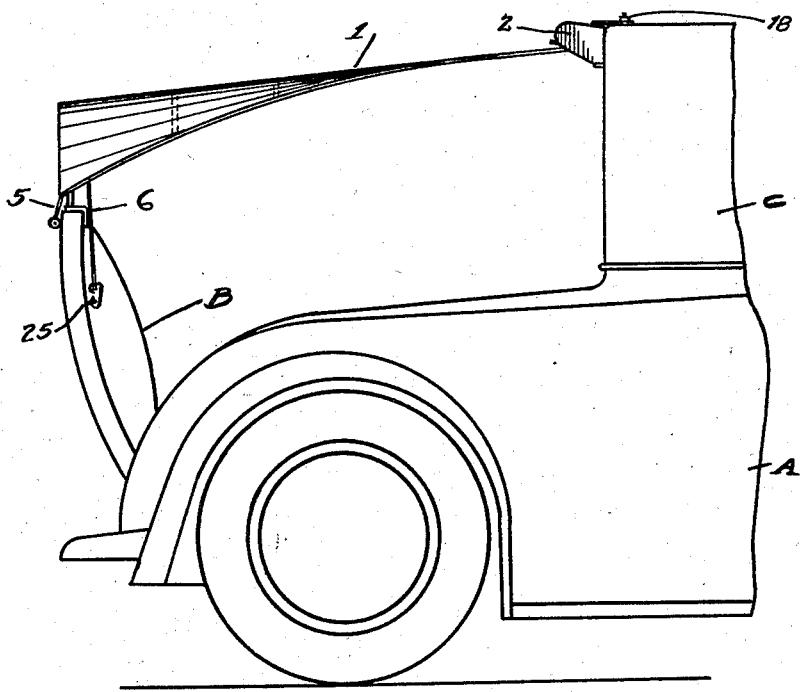
Figure 1 is a fragmentary side elevation of a typical automobile having the usual rumble seat rearwardly of the top, with my device shown in operative position.
Figure 2:
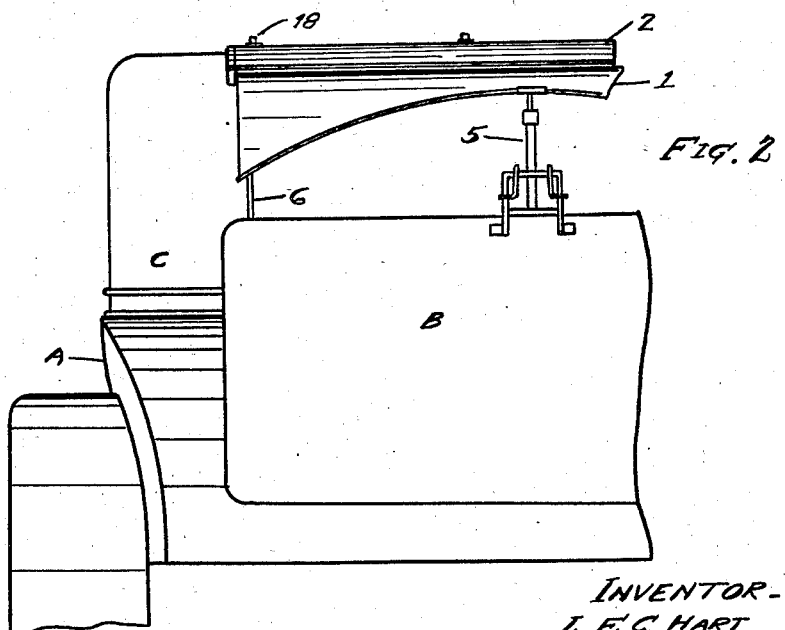
Figure 2 is a rear view of Figure 1.

Referring now by numerals to the drawings, A indicates in part only, a typical automobile having the usual rumble seat B, and the fixed (or collapsible) top C.

The device comprises mainly: a curtain or cover 1 secured at one end to a spring roller 3 so that the curtain may be wound on the roller by the action of its spring and drawn or pulled outwardly to extend over the rumble seat against the action of the spring; a casing 2 in which the roller is journalled, (when the unit is removable); longitudinal rods or curtain supports 4, which serve to retain the curtain in an extended position over the rumble seat against the action of the spring roller, as well as to support the curtain against wind pressure; a rear strut 5 supporting the rear or free end of the curtain when extended over the rumble seat as aforesaid; and rear end member, preferably straps 6 between the rear corners of the curtain and the automobile, these straps being preferably of such length as to cause the corners of the curtain to lie below the top end of the strut.

As it is one of the objects of the invention to provide a rumble seat hood which will adapt itself to all makes of automobiles, some of which may vary in dimensions, particularly in the distance between the rumble seat proper and the top, it is therefore preferable that the rods 4 be so designed as to vary their effective lengths. It is also preferable that the strut 5 be so designed as to vary its effective length. Moreover, in order to make a compact device, which may be purchased as such and installed on the automobile, it is preferable to hinge the rods 4 so that that they may be swung or collapsed and enclosed into the casing after the curtain has been drawn or wound on the roller.

The casing 2 may comprise two metal members or ends 8 between which extends a metal member 9. The member 9 may be bent at top and bottom, as at 40 and 41, respectively. A U-shaped member 16 may also be secured to the member 9, as best shown in Figure 4. The roller 3 may be journalled in the ends 8. The casing may be removably secured to the top, in operative position, as with screws 18 passed through loops 17 extending from and secured to the rear of said casing.

The curtain may be made of some suitable waterproof fabric so as to afford a shelter as well as a shade, and has at its free end two metal, flat bars 26 and 26A having their rear edges, at or near center length, spaced apart to provide a space 26B adapted to removably receive the upper leg of the portion 27 of the strut 5. Extending across the curtain may be spaced thin metal strips 25, these strips being inserted into pockets and being preferably convex in cross section to conform substantially to the radius of curvature of the roller, whereby the curtain will easily wind itself into as compact a mass as possible.

In order to retain the curtain in extended position above the rumble seat, against the action of the spring roller, the longitudinal rods 4 aforesaid are provided. The rods are preferably made and mounted as shown in Figure 3. Thus, the rods may comprise three sections, 4A, 4B, and 4C. The section 4A slides or telescopes in the section 4B. The section 4B is pivotally connected to the section 4C as at 10. Screws 12 may be used to releasably lock the sections 4A and 4B in selected, relative positions. The section 4C may comprise a U-shaped metal member disposed to receive one end of the sections, 4B, and the pivotal connection or pin 10 may be so disposed that the sections 4B and 4C will be capable of interengaging at a point forwardly of the rear end of the member 4C to constitute a toggle lock and thereby retain the curtain in extended position against the action of the spring roller. The rearward end of the section 4C is pivotally connected as at 11 to the curtain rod. The sections 4A are pivotally connected as at 13, to two brackets or shoes 14A and 14, respectively, sliding on two parallel rods 16A and 15, respectively, mounted to the casing as with brackets 45. The rods are slightly inclined with respect to the axis of the casing (see Figure 3) so that both brackets or shoes will be at about the same elevation when both rods 4 are in extended position.

With the rod 4 made and mounted as shown, the effective length of each is variable and adjustable, and when the rods are extended, they will retain the curtain in extended position over the rumble seat. Similarly, the curtain may be drawn by the action of the spring roller, the rods 4 collapsing or folding on their pivotal connections 10 while the shoes 14A and 14 slide on their respective rods to permit of the rods 4 being housed in the casing. Pins 20 from the curtain rod may be used to limit the swinging movement of the rod sections 4C, in one direction, as when the rods have been fully folded into the casing.

The strut 5 may be made of say two telescoping sections 28 and 29, releasably locked in selected, relative positions by means of a set screw 30. The lower section 29 may be formed with a shoulder or angle member 34 adapted to rest upon the top of the seat frame. The upper section 28 may be formed with a hook portion 27 the upper leg of which is inserted into the space 26B between the two members 26 and 26A constituting the curtain rod, so that the rod may be supported in extended position over the rumble seat. Pivoted to the lower section 29, is a clamping member 31 carrying a roller 33 at each end. The strut may thus be readily clamped to the top edge of the rumble seat frame, by providing a spring 32 tensioned to urge the clamp 31 toward the angle 34.

Extending from the rear corners of the curtain, are the flexible members or straps 6 aforesaid. The free end of the strap may be provided with a hook 24 adapted to hook onto suitable means, such as eyes (shown as at 25), positioned inside the seat near its ends. By providing a buckle 23, the effective length of the strap may be varied. Preferably, as already suggested, the length of the straps should normally be such, that the curtain rod is bent at the ends, to extend below the top of the strut. Preferably, also, the rods 4 are distanced from the side edges of the curtain, so as to permit of the overhanging portions of the curtain crosswise slats 25 to flex or bend, thus allowing the edges of the curtain to assume a curved shape between the roller and the curtain rod.

To close the casing, as when the unit is removed, or the curtain has been drawn home into the casing, dome fasteners may be used. Thus, the complementary parts 21A and 22 of such fasteners may be positioned on the curtain, rearwardly of the rod, and on the lower portion or edge of the casing, respectively.

What I claim is:—

1. In combination with an automobile having a rumble seat, a casing adapted to be secured to the top, a spring roller journalled in said casing, a curtain wound on said roller having a flexible rod at the free end thereof, said curtain having crosswise flexible slats, rods between said casing and curtain rod for retaining said curtain in extended position above the rumble seat against the action of said spring roller, said rods being disposed inwardly of the side edges of said curtain, a strut between the automobile and said curtain rod disposed intermediately of the length thereof, and means on each side of said strut between the automobile and said curtain rod tension means to flex said curtain rod to thereby impart a curved or arched shape to said curtain.

2. In combination with an automobile having a rumble seat, a spring roller journalled adjacent the top of the automobile, a curtain wound on said roller having a flexible rod at the free end thereof, said curtain having crosswise flexible slats, rods between said roller and curtain rod for retaining said curtain in extended position above the rumble seat against the action of said roller, said rods being disposed under said curtain, a strut between the automobile and said curtain rod disposed intermediately of the length thereof, and tension means on each side of said strut adapted to flex said curtain rod to thereby impart a curved or arched shape to said curtain.

3. In combination with an automobile having a rumble seat, a spring roller journalled adjacent the top of the automobile, a curtain wound on said roller having a flexible rod at the free end thereof, said curtain having crosswise flexible slats, rods between said roller and curtain rod for retaining said curtain in extended position above the rumble seat against the action of said roller, said rods being disposed under said curtain, means rising from the automobile for supporting the rear end of said curtain, and tension means adapted to flex said curtain rod to thereby impart a curved or arched shape to said curtain.

4. In combination with an automobile having a rumble seat, a spring roller journalled adjacent the top of the automobile, a curtain wound on said roller having a rod at the free end thereof, foldable rods between said roller and curtain rod operable to retain said curtain in extended position above the rumble seat against the action of said spring roller and in folded position adjacent said roller, alternately, said rods being pivotally and slidably mounted at one end and pivotally mounted at the other end, and means between the automobile and said curtain rod for supporting the rear end of said curtain above the rumble seat.

5. In combination with an automobile having a rumble seat, a spring roller journalled adjacent the top of the automobile, a curtain wound on said roller having a rod at the free end thereof, foldable rods pivotally mounted at one end to said curtain rod and pivotally and slidably mounted at the other end adjacent said roller operable to retain said curtain in extended position above the rumble seat against the action of said spring roller and to be folded adjacent said roller, alternately, and means between the automobile and said curtain rod for supporting the rear end of said curtain above the rumble seat.

6. In a covering for the rumble seat of an automobile, a casing adapted to be secured to the top of the automobile, a spring roller journalled in said casing, a curtain wound on said roller having a rod at the free end thereof, runways secured to said casing, foldable rods pivotally mounted at one end to said curtain rod and pivotally and slidably mounted at the other end on said runways operable to retain said curtain in extended position above the rumble seat against the action of said spring roller and to be folded into said casing, alternately, and means between the automobile and said curtain rod for supporting said curtain above the rumble seat.

7. In a covering for the rumble seat of an automobile, a unit comprising a casing adapted to be secured to the top of the automobile, a spring roller journalled in said casing, a curtain wound on said roller, co-acting means on said curtain and casing for releasably locking the end of said curtain to said casing when said curtain has been drawn home, a pair of runways on said casing, a shoe slidably mounted on each of said runways, means limiting the sliding movement of each of said shoes in one direction, a foldable rod pivotally mounted between said curtain rod and each of said shoes, said rods being adjustable as to their effective lengths, means on said curtain rod for receiving the end of a strut from the automobile, and means from said curtain rod for fastening to the automobile.

L. F. C. HART.